(12) United States Patent
Ye (10) Patent No.: US 11,936,510 B2
(45) Date of Patent: Mar. 19, 2024

(54) ELECTRONIC DEVICE, METHOD EXECUTED BY THE ELECTRONIC DEVICE AND COMPUTER READABLE MEDIUM

(71) Applicant: ARRIS Enterprises LLC, Suwanee, GA (US)

(72) Inventor: Yongqiang Ye, Guangdong (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 18/023,426

(22) PCT Filed: Aug. 27, 2021

(86) PCT No.: PCT/US2021/047869
§ 371 (c)(1),
(2) Date: Feb. 27, 2023

(87) PCT Pub. No.: WO2022/051177
PCT Pub. Date: Mar. 10, 2022

(65) Prior Publication Data
US 2023/0318903 A1    Oct. 5, 2023

(30) Foreign Application Priority Data
Sep. 1, 2020   (CN) ........................ 202010903812.2

(51) Int. Cl.
*H04L 41/0213* (2022.01)
*H04L 1/16* (2023.01)
(52) U.S. Cl.
CPC ............ *H04L 41/0213* (2013.01); *H04L 1/16* (2013.01)

(58) Field of Classification Search
CPC .............................. H04L 41/0213; H04L 1/16
See application file for complete search history.

(56) References Cited

U.S. PATENT DOCUMENTS

| | | | |
|---|---|---|---|
| 5,978,845 A * | 11/1999 | Reisacher | H04L 41/0213 709/202 |
| 9,893,971 B1 * | 2/2018 | Singh | H04L 41/0213 |
| 2012/0096137 A1 * | 4/2012 | He | H04L 41/0213 709/223 |

OTHER PUBLICATIONS

Snmpwalk(1)-Linux man page, Retrieved from internet archive wayback machine, https://web.archive.org/web/20160912094302/http://linux.die.net/man/1/snmpwalk, 2016 (Year: 2016).*

(Continued)

*Primary Examiner* — Caroline H Jahnige
(74) *Attorney, Agent, or Firm* — Wenderoth, Lind & Ponack, L.L.P.

(57) ABSTRACT

The present disclosure relates to an electronic device and a method executed by the electronic device, and a computer-readable medium. The electronic device includes a memory on which instructions are stored and a processor. The processor is configured to execute the instructions stored on the memory to cause the electronic device to execute the following operations: receiving a Simple Network Management Protocol (SNMP) request from a network management station; in response to the receipt of the SNMP request, starting a timer at the electronic device, a timeout period of the timer being set to a first predetermined time period; and in response to a case where the electronic device has not completed an operation required by the SNMP request when the timer expires, sending a timeout message to the network management station as a response to the SNMP request.

19 Claims, 6 Drawing Sheets

(56) References Cited

OTHER PUBLICATIONS

International Search Report and the Written Opinion of the International Searching Authority dated Dec. 6, 2021 in International (PCT) Application No. PCT/US2021/047869.
Adventnet: "Agent toolkit Jave Edition 6—Building SNMP Agents", Dec. 31, 2004 (Dec. 31, 2004). pp. 1-242, XP055865787, Pleasanton, CA, USA Retrieved from the Internet: URL:https ((manualzz.com/doc/47200017/adventnet-agent-toolkit -java-edition---building-snmp#p215 [retrieved on Nov. 25, 2021] Chapter 13 "Implementing SNMP Proxy".
Daniele Compaq Computer Corporation B Wijnen T J Watson Research Center M et al: "Agent Extensibility (AgentX) Protocol Version 1; rfc2741. txt", Agent Extensibility (Agentx) Protocol Version 1; RFC2741. TXT, Internet Engineering Task Force, IETF; Standard, Internet Society (ISOC) 4, Rue Des Fa Lai Ses Ch—1205 Geneva, Switzerland, Jan. 1, 2000 (Jan. 1, 2000), XP01500524, p. 4, line 1-p. 80, last line.
IBM: "IBM Spectrum Scale Version 4 Release 2.0—Advanced Administration Guide—Chapter 12", Dec. 31, 2016 (Dec. 31, 2016), pp. 1-472, XP055865795, Retrieved from the Internet : URL:https:((www.ibm.comjdocs(en(STXKQY 4.2.0/c2370326. pdf— [retrieved on Nov. 25, 2021] Chapter 12 "GPFS SNMP Support".
International Preliminary Report on Patentability and Written Opinion dated Mar. 16, 2023 in International Application No. PCT/US2021/047869.

\* cited by examiner

ELECTRONIC DEVICE, METHOD EXECUTED BY THE ELECTRONIC DEVICE AND COMPUTER READABLE MEDIUM

TECHNICAL FIELD

The present disclosure generally relates to network management, and more specifically, to the Simple Network Management Protocol (SNMP).

BACKGROUND ART

SNMP is an Internet standard protocol for collecting and organizing information about managed devices on IP networks and for modifying that information to change device behavior. SNMP has been widely used in network management because it is simple and reliable. Common network devices all support SNMP, for example, cable modems, routers, switches, servers, workstations, printers, and the like.

In an SNMP managed network, a network management station (NMS) communicates with SNMP agents running on each managed device. In a typical use scenario, the NMS may send an SNMP request to an SNMP agent. The SNMP agent performs an operation according to the received SNMP request and returns an SNMP response to the NMS, for example, including a parameter required by the NMS in the response. In addition, when the SNMP agent detects that an important event has occurred on the managed device where the SNMP agent is located, the SNMP agent may also actively send a notification to the NMS.

In the SNMP operation, the NMS may encounter a timeout. For example, after the NMS sends an SNMP request, the timeout timer on the NMS expires before the NMS receives a response from the SNMP agent. Such SNMP timeout may be caused by various reasons. For example, the SNMP request or the SNMP response may be dropped by the interim network nodes due to network congestions. For another example, the SNMP request may be discarded by the managed device for the managed device has disabled SNMP or due to firewall settings of the managed device. For another example, the SNMP agent may take excessively long time to process the SNMP request and is not able to respond before the timeout timer at the NMS expires. However, when SNMP timeout occurs, the NMS cannot determine the cause of the timeout. As a result, the technician would have to spend a lot of time to identify the cause of the timeout and to seek a solution.

Therefore, there is a need for an improved method to deal with the problem of SNMP timeout.

SUMMARY OF THE INVENTION

Some aspects of the present disclosure relate to an electronic device, including: a memory, on which instructions are stored; and a processor, configured to execute the instructions stored on the memory to cause the electronic device to execute the following operations: receiving a Simple Network Management Protocol (SNMP) request from a network management station; in response to the receipt of the SNMP request, starting a timer at the electronic device, a timeout period of the timer being set to a first predetermined time period; and in response to a case where the electronic device has not completed an operation required by the SNMP request when the timer expires, sending a timeout message to the network management station as a response to the SNMP request.

In some embodiments, the timeout message includes: an object identifier (OID) of an object to be operated according to the SNMP request, and information indicating that a timeout has occurred at the electronic device.

In some embodiments, the electronic device includes a plurality of subsystems, and the timeout message further includes information indicating a subsystem that has not completed the SNMP request when the timeout occurs.

In some embodiments, the SNMP request is a GETNEXT request or a GETBULK request included in an SNMP WALK procedure, and the OID included in the timeout message is used to continue the SNMP WALK procedure.

In some embodiments, the first predetermined time period is shorter than a second predetermined time period set by the network management station for monitoring the timeout of the SNMP request.

In some embodiments, the processor is further configured to execute the instructions stored on the memory to cause the electronic device to carry out the following operations: in response to the receipt of a retransmitted SNMP request with the same request ID as the SNMP request from the network management station before the timer expires, stopping processing the SNMP request, and sending the timeout message to the network management station as a response to the retransmitted SNMP request.

In some embodiments, the timeout message conforms to a format of an SNMP response corresponding to the SNMP request.

Some other aspects of the present disclosure relate to a method executed by an electronic device, comprising: receiving a Simple Network Management Protocol (SNMP) request from a network management station; in response to the receipt of the SNMP request, starting a timer at the electronic device, a timeout period of the timer being set to a first predetermined time period; and in response to a case where the electronic device has not completed an operation required by the SNMP request when the timer expires, sending a timeout message to the network management station as a response to the SNMP request.

In some embodiments, the timeout message includes: an object identifier (OID) of an object to be operated according to the SNMP request, and information indicating that a timeout has occurred at the electronic device.

In some embodiments, the electronic device includes a plurality of subsystems, and the timeout message further includes information indicating a subsystem that has not completed the SNMP request when the timeout occurs.

In some embodiments, the SNMP request is a GETNEXT request or a GETBULK request included in an SNMP WALK procedure, and the OID included in the timeout message is used to continue the SNMP WALK procedure.

In some embodiments, the first predetermined time period is shorter than a second predetermined time period set by the network management station for monitoring the timeout of the SNMP request.

In some embodiments, the method further includes: in response to the receipt of a retransmitted SNMP request with the same request ID as the SNMP request from the network management station before the timer expires, stopping processing the SNMP request, and sending the timeout message to the network management station as a response to the retransmitted SNMP request.

Some other aspects of the present disclosure relate to a non-transitory computer-readable storage medium having instructions stored thereon, when executed by a processor of an electronic device, the instruction causing the electronic device to execute the following operations: receiving a Simple Network Management Protocol (SNMP) request from a network management station; in response to the receipt of the SNMP request, starting a timer at the electronic device, a timeout period of the timer being set to a first predetermined time period; and in response to a case where the electronic device has not completed an operation required by the SNMP request when the timer expires, sending a timeout message to the network management station as a response to the SNMP request.

In some embodiments, the timeout message includes: an object identifier (OID) of an object to be operated according to the SNMP request, and information indicating that a timeout has occurred at the electronic device.

In some embodiments, the electronic device includes a plurality of subsystems, and the timeout message further includes information indicating a subsystem that has not completed the SNMP request when the timeout occurs.

In some embodiments, the SNMP request is a GETNEXT request or a GETBULK request included in an SNMP WALK procedure, and the OID included in the timeout message is used to continue the SNMP WALK procedure.

In some embodiments, the first predetermined time period is shorter than a second predetermined time period set by the network management station for monitoring the timeout of the SNMP request.

In some embodiments, it further includes an instruction that, when executed by the processor of the electronic device, causes the electronic device to execute the following operations: in response to the receipt of a retransmitted SNMP request with the same request ID as the SNMP request from the network management station before the timer expires, stopping processing the SNMP request, and sending the timeout message to the network management station as a response to the retransmitted SNMP request.

Some other aspects of the present disclosure relate to an apparatus implemented by an electronic device, including components for executing each step of the method described above.

BRIEF DESCRIPTION OF THE ATTACHED DRAWINGS

For a better understanding of the present disclosure and to show how to implement the present disclosure, this description will be made with reference to the attached drawings by way of examples, wherein.

It should be noted that throughout the drawings, similar reference numerals and signs refer to corresponding parts. In addition, multiple instances of the same part are designated by a common prefix separated from the instance number by a dash.

SPECIFIC EMBODIMENTS

The following detailed description is made with reference to the attached drawings, and the following detailed description is provided to facilitate comprehensive understanding of various exemplary embodiments of the present disclosure. The following description includes various details to facilitate understanding. However, these details are merely considered as examples, and not for limiting the present disclosure. The present disclosure is defined by the appended claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

Figure 1:
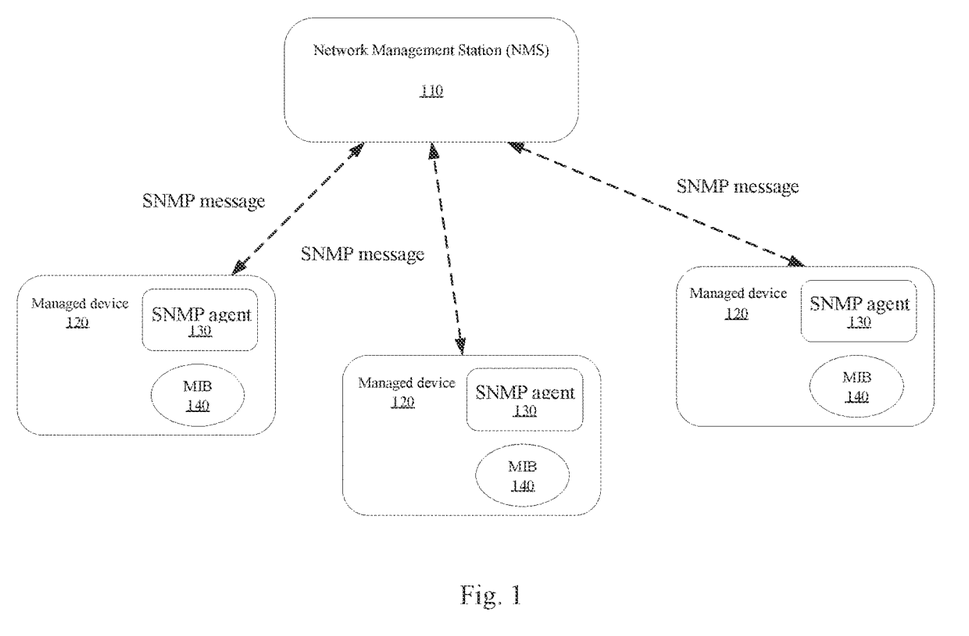
FIG. 1 shows an exemplary SNMP managed network to which embodiments of the present disclosure can be applied.

FIG. 1 shows an exemplary SNMP managed network to which embodiments of the present disclosure can be applied. As shown in FIG. 1, a network management station (NMS) 110 communicates with each SNMP agent 130 running on each managed device 120. The NMS 110 and the SNMP agent 130 are loosely coupled, and the communication between them is usually completed through the User Datagram Protocol (UDP). Generally, the NMS 110 may send an SNMP request to the agent 130, and the agent 130 performs operations according to the received SNMP request and returns an SNMP response to the NMS 110. In addition, when the agent 130 detects that an important event has occurred on the managed device 120, the agent may also actively send a message to the NMS 110 for notification.

The NMS 110 can run on any network node. For example, the NMS 110 may run on a dedicated network management device, or it may run on a managed device 120. In addition, although only one NMS 110 is shown in FIG. 1, there may be one or more NMSs in the managed network. A network administrator can manage each managed device 120 through the NMS 110.

Each SNMP agent 130 will maintain a corresponding management information database (MIB) 140. The MIB 140 defines a collection of managed objects in the managed device 120, and the managed objects may also be generally referred to as MIB objects or simply objects. Each MIB object has a corresponding object identifier (OID). The MIB object has a very broad scope, and it may include various control and status information required for network management. Using the SNMP, the NMS 110 can read the value of the object in the MIB 140 through the agent 130 to collect various information required by the NMS, and can also set the value of the object in the MIB 140 through the agent 130 to change the configuration of the managed device 120. The structure of the MIB will be described in more detail below with reference to FIG. 2.

Figure 2:
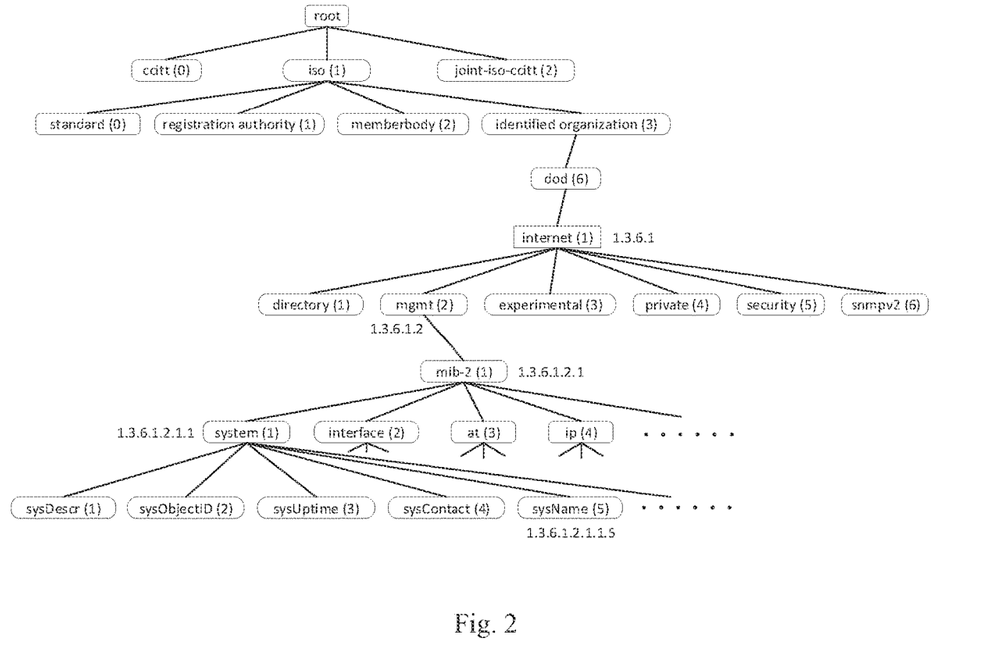
FIG. 2 shows an exemplary management information database (MIB) tree structure.

FIG. 2 shows an exemplary MIB tree structure. Each leaf node of the MIB tree represents an MIB object, and the branch nodes in the middle layer of the MIB tree represent the logical grouping of the MIB objects. Each node can be uniquely identified by an OID, and usually also has a corresponding node name. Generally, the OID is a set of integers separated by dots, that is, the path from the root node to it.

For example, as shown in FIG. 2, the OID of the branch node internet is 1.3.6.1; the branch node mgmt under it represents management, and its OID is 1.3.6.1.2; keeping looking down, the branch node mib-2 represents the management information database, and its OID is 1.3.6.1.2.1; keeping looking down, four branch nodes, i.e., system, interface, at, and ip are exemplarily shown, and the OIDs thereof are 1.3.6.1.2.1.1, 1.3.6.1.2.1.2, 1.3.6.1.2.1.3, and 1.3.6.1.2.1.4, respectively. Here, system represents the overall information of the managed devices (for example, gateways, routers, etc.), interface represents information related to each network interface, at represents information related to address translation, and ip represents information related to the implementation and operation of IP protocols. The node mib-2 may further have more branch nodes, which are not shown in FIG. 2 for brevity. The MIB tree can continue to branch down to the leaf nodes. For example, the leaf node sysName represents the MIB object of the name of the managed device, the OID thereof is 1.3.6.1.2.1.1.5, and the object value is a string of the name of the managed device. Those of ordinary skill in the art will understand that since the leaf node sysName is a scalar node, when accessing the object corresponding to the leaf node, it is necessary to add 0.0 (i.e., 1.3.6.1.2.1.1.5.0) after its OID to indicate an access to an instance of the object. It should be noted that the MIB tree in FIG. 2 is merely an example representing the MIB hierarchical structure; FIG. 2 does not show all the branches, and the MIB can also have many other forms.

Back to FIG. 1. There are many types of SNMP messages sent by the NMS 110 to the agent 130, generally including GET, GETNEXT, GETBULK, and SET requests.

Through the GET request, the NMS 110 can acquire the object value in the managed device 120 corresponding to the OID included in the GET request. Through the GETNEXT request, the NMS can acquire the OID and the object value of the next object in the MIB tree of the OID included in the GETNEXT request. The GETBULK request is similar to the GETNEXT request. However, it is possible to acquire the OIDs of the next plurality of objects and their corresponding plurality of object values in the MIB tree of the OID included in the GETBULK request each time, and this is equivalent to consecutively executing the GETNEXT operation multiple times. In the GETBULK request, it is possible to define the number of OIDs and object values acquired each time, and this is equivalent to the number of times of executing the GETNEXT operation.

The NMS 110 may perform an SNMP operation called SNMP WALK based on the GETNEXT or GETBULK request. The SNMP WALK procedure may include a series of GETNEXT or GETBULK requests that are executed automatically and iteratively to traverse all the leaf nodes in the MIB tree that meet the conditions. Specifically, an OID may be given in a command line of the SNMP WALK procedure, and according to this, a series of GETNEXT or GETBULK requests will be executed iteratively to acquire the values of all leaf nodes (i.e., MIB object) in the MIB subtree under the given OID. For example, referring to FIG. 2, if the OID included in the SNMP WALK command line is 1.3.6.1.2.1.1, that is, the branch node system in the MIB tree, then the execution of the SNMP WALK procedure will return the OIDs of all leaf nodes and the object values thereof under the branch node system.

The SET request can be used by the NMS 110 to change the object value in the managed device 120 corresponding to the OID in the SET request. Through the SET request, the NMS 110 can change the configuration of the managed device 120 or control the operating state of the managed device 120. For example, the NMS 110 may set the name of the managed device 120, close a port on the managed device 120, clear items in an address resolution table of the managed device 120, etc. through the SET request.

The SNMP message sent by the agent 130 to the NMS 110 usually includes a response to the SNMP request sent by the NMS 110 and a TRAP message. Through the TRAP message, the agent 130 can actively notify the NMS 110 of an important event. For example, the TRAP message can be used to notify the NMS 110 of line failure, connection interruption and restoration, authentication failure, and the like.

It should be noted that although FIG. 1 shows that there is only one agent 130 on each managed device 120, there may also be a plurality of agents 130 on the managed device 120 to take charge of different device modules. In addition, in some cases, there may be a master agent and a plurality of sub-agents on the managed device 120 to cooperate to complete the function of the agent 130.

As described above, in the SNMP operation, the NMS may encounter a timeout. For example, after the NMS sends an SNMP request, the timeout timer on the NMS expires before the NMS receives a response from the SNMP agent. Such SNMP timeout may be caused by various reasons, including network congestions, managed device settings, the agent processing the SNMP request for too long, and the like.

Moreover, with the popularization of modular design of network devices, the occurrence of SNMP timeouts has become more and more common. For example, the managed device may include a plurality of subsystems that communicate with each other. For some GET or GETNEXT requests that need to read the runtime information of the managed device, the agent may need to spend a lot of time to collect the requested information from different subsystems, resulting in timeout. For example, it may take a long time for a wireless access point (AP) device to collect Wi-Fi client information according to an SNMP request from the NMS, especially when there is a large number of Wi-Fi clients connected to the AP, resulting in an SNMP timeout.

According to the existing SNMP solution, when an SNMP timeout occurs, the NMS cannot determine the cause of the time out, and this will cause the technician to spend a lot of time to identify the cause of the timeout and to seek a solution.

In addition, the SNMP timeout may also cause the interruption of the SNMP WALK procedure. In the SNMP WALK procedure, once the SNMP agent has a problem in processing one of the GETNEXT or GETBULK requests, resulting in an SNMP timeout, the SNMP WALK procedure will be interrupted because no response is received from the agent, and the NMS cannot determine the OID to be included in the subsequent GETNET or GETBULK request.

Therefore, there is a need for an improved method to deal with the problem of SNMP timeout.

Figure 3:
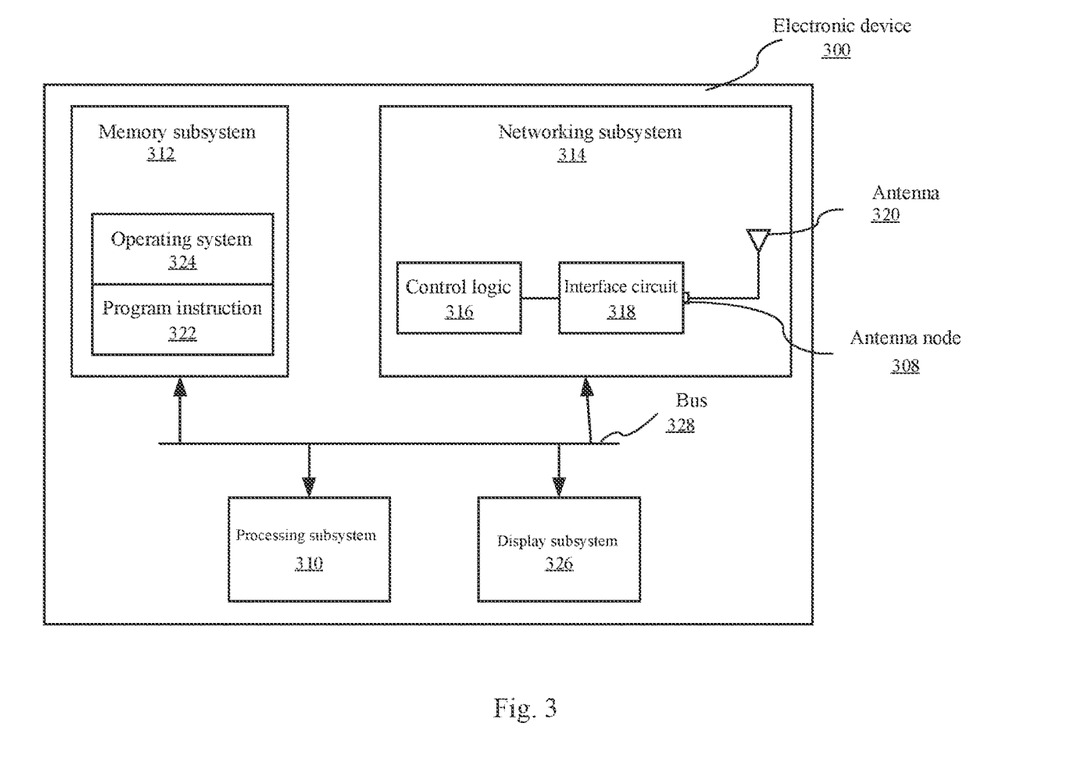
FIG. 3 shows an exemplary electronic device which can be used to implement a managed device according to an embodiment of the present disclosure.

FIG. 3 shows an exemplary electronic device which can be used to implement a managed device according to an embodiment of the present disclosure. The electronic device can be used to implement, for example, the managed device 120 in FIG. 1. Moreover, the electronic device may be various devices that can work on the network, such as cable modems, routers, switches, servers, workstations, printers, and so on.

As shown in FIG. 3, the electronic device 300 may include a processing subsystem 310, a memory subsystem 312, and a networking subsystem 314. The processing subsystem 310 includes one or more devices configured to perform computing operations. For example, the processing subsystem 310 may include one or more microprocessors, ASICs, microcontrollers, programmable logic devices, graphics processing units (GPU) and/or one or more digital signal processors (DSP). A program instruction 322 may be executed by the processing subsystem 310 to cause the electronic device 300 to execute various operations described herein.

The memory subsystem 312 includes one or more devices for storing data and/or instructions used for the processing subsystem 310 and the networking subsystem 314. For example, the memory subsystem 312 may include a dynamic random access memory (DRAM), a static random access memory (SRAM), and/or other types of memory (sometimes collectively or individually referred to as "computer-readable storage medium").

In some embodiments, the memory subsystem 312 is coupled to one or more high-capacity mass storage devices (not shown). For example, the memory subsystem 312 may be coupled to a magnetic or optical driver, a solid state driver, or another type of mass storage device. In these embodiments, the electronic device 300 may use the memory subsystem 312 as a fast-access storage of frequently used data, whereas the mass storage device is used for storing infrequently used data.

The networking subsystem 314 includes one or more devices that are configured to be coupled to and/or communicate over wired and/or wireless networks (i.e., to perform network operations), comprising: a control logic 316, an interface circuit 318, and one or more antennas 320 (or antenna elements). (Although FIG. 3 includes one or more antennas 320, in some embodiments, the electronic device 300 includes one or more nodes, such as node 108, that can be coupled to one or more antennas 320. Therefore, the electronic device 300 may or may not include one or more antennas 320.) For example, the networking subsystem 314 may include a Bluetooth networking system, a cellular networking system (for example, 3G/4G/5G networks, such as UMTS, LTE, etc.), a USB networking system, a networking system based on the standards described in IEEE 802.11 (for example, Wi-Fi networking system), Ethernet networking system, and/or another networking system.

In the electronic device 300, a bus 328 is used to couple the processing subsystem 310, the memory subsystem 312, and the networking subsystem 314 together. The bus 328 may include electrical, optical, and/or electro-optical connections of the subsystems through which commands, data and the like may be transmitted. Although only one bus 328 is shown for clarity, different embodiments may include different numbers or configurations of electrical, optical, and/or electro-optical connections in the subsystems.

In some embodiments, the electronic device 300 includes a display subsystem 326 for showing information on a display device, which may include a display driver and a display, such as a liquid crystal display and a multi-touch screen.

Although specific components are used to describe the electronic device 300, in alternative embodiments, different components and/or subsystems may exist in the electronic device 300. For example, the electronic device 300 may include one or more additional processing subsystems, memory subsystems, networking subsystems, and/or display subsystems. In addition, the electronic device 300 may not have one or more of the subsystems. Furthermore, in some embodiments, the electronic device 300 may include one or more additional subsystems not shown in FIG. 3. Also, although separate subsystems are shown in FIG. 3, in some embodiments, some or all of the given subsystems or components may be integrated into one or more of other subsystems or components in the electronic device 300. For example, in some embodiments, the program instruction 322 is included in the operating system 324 and/or the control logic 316 is included in the interface circuit 318.

As described above, in the existing SNMP solutions, if an SNMP timeout occurs at the NMS, the technician usually needs to spend a lot of time to identify the cause of the timeout and seek a solution. Therefore, according to an embodiment of the present disclosure, a timer (hereinafter referred to as an internal time because it is inside the managed device relative to the timer at the NMS) may be provided on the managed device, and the timer has a corresponding internal timeout period. Once the managed device receives an SNMP request from the NMS, the managed device starts the internal timer. If the agent on the managed device has not completed an operation required by the SNMP request (for example, has not acquired the required object value, or has not set the specified object value) when the internal time expires, a timeout message (hereinafter referred to as internal timeout message) is sent to the NMS as a response to the SNMP request. In this way, the NMS can learn in time that the processing time of the SNMP agent on the managed device is too long, which indicates that the hardware or software related to the OID targeted by the request may have a fault or defect. As a result, the technician can repair the managed device in a timely and targeted manner without excluding possible causes such as network congestions, interim network node settings (for example, firewall settings), and managed device settings (for example, SNMP is disabled on the managed device, authentication failure, firewall settings) one by one.

The embodiments of the present disclosure and the advantages thereof will be described in more detail below with reference to FIG. 4 to FIG. 6.

Figure 4:
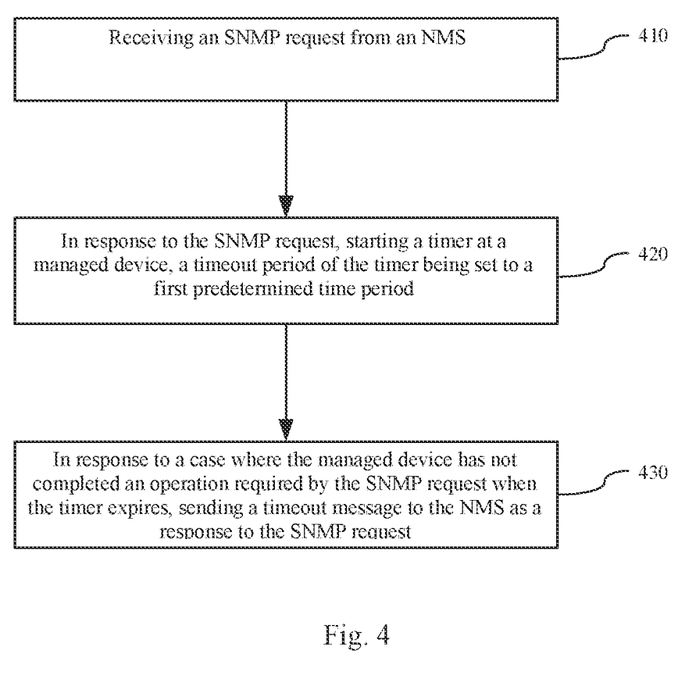
FIG. 4 is a flow chart of an exemplary method for processing an SNMP request according to an embodiment of the present disclosure.

FIG. 4 is a flow chart of an exemplary method for processing an SNMP request according to an embodiment of the present disclosure. The method shown in FIG. 4 may be executed by, for example, an electronic device 300 shown in FIG. 3 as a managed device. Moreover, the managed device (for example, the managed device 120 shown in FIG. 1) may execute the method shown in FIG. 4 by running the SNMP agent (for example, the agent 130 shown in FIG. 1) thereon.

In 410, the managed device receives an SNMP request from the NMS (for example, the NMS 110 shown in FIG. 1). The SNMP request may be, for example, a GET request, a SET request, a GETNEXT request, a GETBULK request, or any other request that conforms to the SNMP protocol. The SNMP request may also be a GETNEXT request or a GETBULK request included in the SNMP WALK procedure.

In 420, in response to the receipt of the SNMP request, the managed device starts a timer (i.e., an internal timer) at the managed device, and the timeout period of the timer is set as a first predetermined time period (i.e., an internal timeout period). The internal timeout period may be set to, for example, 3 seconds, 5 seconds, 10 seconds, or any other suitable value.

In 430, in response to a case where the managed device has not completed an operation required by the SNMP request when the internal timer expires, the managed device sends a timeout message (i.e., an internal timeout message) to the NMS as a response to the SNMP request. For example, if the SNMP agent on the managed device has not yet acquired the object value required by the GET request or has not set the object value specified by the SET request when the internal timer expires, the managed device may send a timeout message to the NMS as a response to the SNMP request.

According to an embodiment, the internal timeout period at the managed device may be set to be shorter than the timeout period at the NMS (hereinafter referred to as the external timeout period). In this way, the NMS can receive an internal timeout message from the managed device as an SNMP response before a timeout (hereinafter referred to as an external timeout) occurs at the NMS. Therefore, no external timeout will occur at the NMS. However, in some cases, the internal timeout period is set by the managed device instead of the NMS. The managed device may not know how much is the external timeout period at the NMS, and thus there may be a case where the internal timeout period is set to be longer than the external timeout period. In this case, an external timeout may occur before the internal timer on the managed device expires, and thus the managed device would receive a retransmitted SNMP request from the NMS, which is usually a request with the same request ID as the previous SNMP request. According to an embodiment, in response to the receipt of the retransmitted SNMP request from the NMS before the internal timer expires, the managed device may immediately stop processing the previous SNMP request, and send an internal timeout message to the NMS as a response to the retransmitted SNMP request. After receiving the internal timeout message, the NMS knows that an internal timeout has occurred at the managed device, and thus the technician can repair the managed device. Moreover, the NMS can avoid retransmitting the SNMP request.

According to an embodiment, the internal timeout message sent by the managed device may include information indicating that a timeout has occurred at the managed device, for example, a string of "internal timeout" or any other indicator indicating an internal timeout at the managed device.

The internal timeout message may further include an OID of an object to be operated according to the SNMP request. For a GET request, the OID included in the internal timeout message is the OID included in the GET request, that is, the OID of the object whose information the NMS needs to acquire. For a SET request, the OID included in the internal timeout message is the OID included in the SET request, that is, the OID of the object that the NMS needs to set. For a GETNEXT request, the OID included in the internal timeout message is the OID of the next object of the OID included in the GETNEXT request. For a GETBULK request, the OID included in the internal timeout message is the OIDs of the subsequent plurality of objects of the OID included in the GETBULK request.

The internal timeout message may conform to a format of a normal SNMP response sent by the SNMP agent under normal circumstances (that is, has not expired), and it will also include the OID of the object to be operated according to the SNMP request. The information used to indicate the internal timeout may be placed the an OID value field of the normal SNMP response.

For the SNMP WALK procedure, there are further advantages in including the OID of the object to be operated according to the SNMP request in the internal timeout message. Specifically, even if an internal timeout occurs in a GETNEXT request (or a GETBULK request) in the WALK procedure, the SNMP agent will still return the OID of the next object to the NMS through the internal timeout message. As a result, the NMS can continue to issue the next GETNEXT request based on the OID, so that the WALK procedure can continue without interruption. Therefore, even if the value of an object cannot be acquired due to a fault or defect of the managed device, it would not affect the smooth completion of the SNMP WALK procedure. This will be described in more detail below with reference to FIG. 6.

According to an embodiment, the internal timeout message may further include information indicating a subsystem that has not completed the SNMP request when the internal timeout occurs. For a managed device that includes a plurality of subsystems, the SNMP agent located on one subsystem may need to collect information required by the SNMP request from other subsystems, or set objects in different subsystems according to the SNMP request. For example, for a home gateway device, the SNMP agent, Wi-Fi chip, and WLAN interface may be located on different subsystems, and the SNMP request may need to acquire information about objects in both the Wi-Fi chip and the WLAN interface. Accordingly, the SNMP agent may need to respectively request relevant information from the subsystems where the Wi-Fi chip and the WLAN interface are located. When the internal timeout occurs, the SNMP agent may have already received a response from the WLAN interface but have not yet received a response from the Wi-Fi chip. This may be due to a fault of the subsystem where the Wi-Fi chip is located. In this case, including the information indicating the subsystem associated with the Wi-Fi chip in the internal timeout message helps the NMS further identify the specific subsystem with the problem in the managed device, so that those of ordinary skill in the art can process with higher efficiency.

Figure 5A:
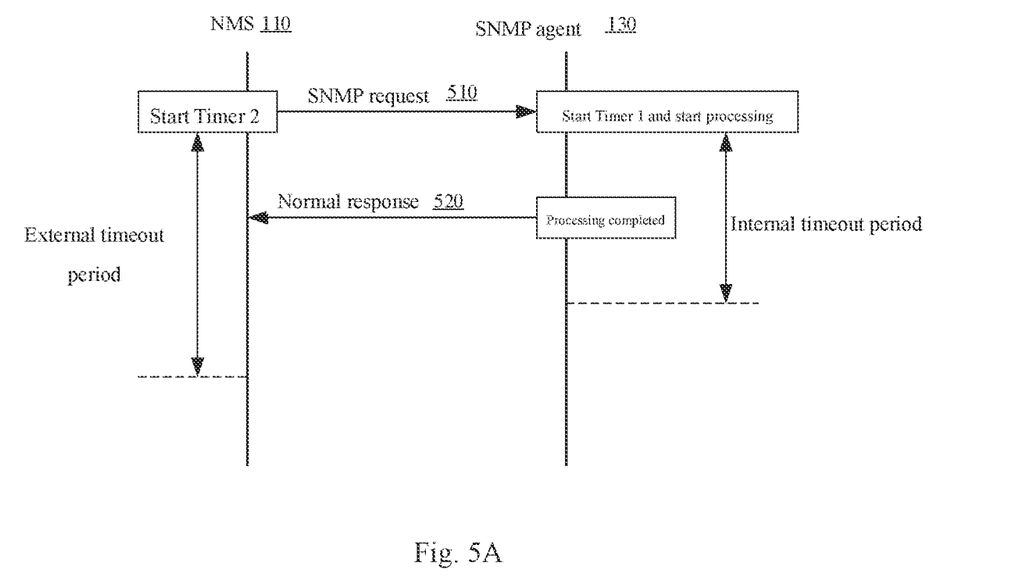
FIG. 5A to 5C show an exemplary signaling flow in an SNMP managed network according to an embodiment of the present disclosure.
Figure 5B:
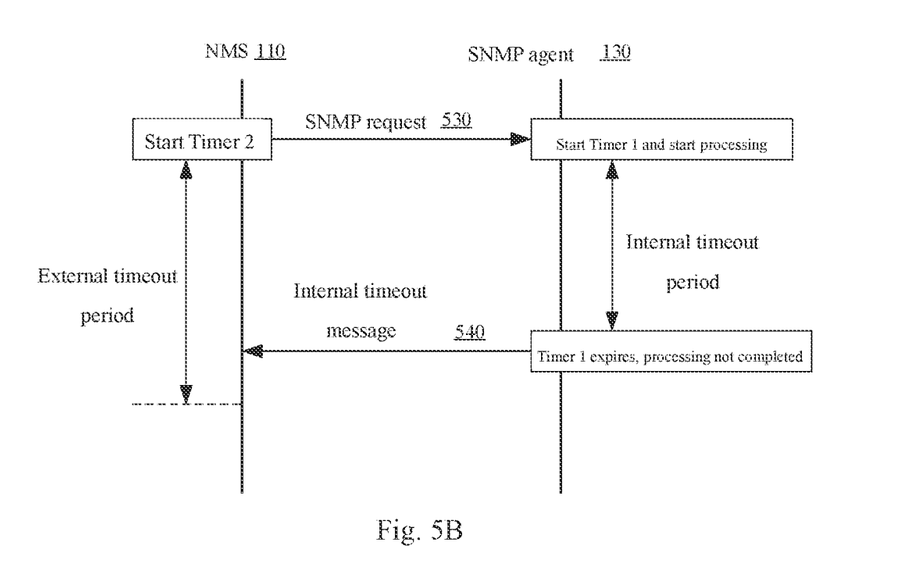
Figure 5C:
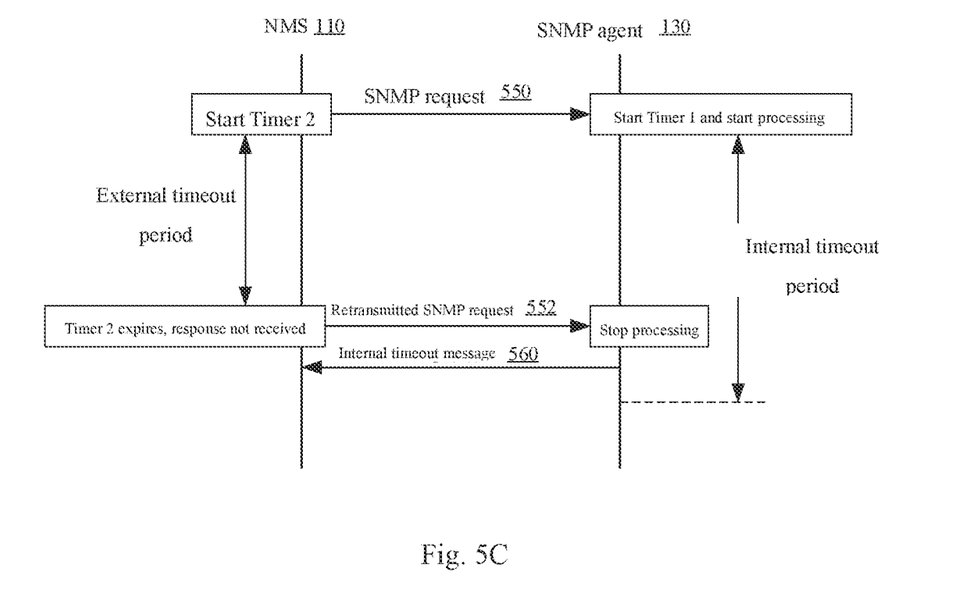

FIGS. 5A to 5C show an exemplary signaling flow in an SNMP managed network according to an embodiment of the present disclosure.

FIG. 5A shows a situation where no timeout occurs. As shown in FIG. 5A, at the beginning, the NMS 110 sends an SNMP request 510 to the agent 130 on the managed device 120, and starts a timer Timer 2 on the NMS. In response to the receipt of the SNMP request 510, the agent 130 starts an internal timer Timer 1, and starts to perform an operation required by the SNMP request 510. In the example shown in FIG. 5A, the internal timeout period of Timer 1 is shorter than the external timeout period of Timer 2. Before Timer 1 expires, the agent 130 has completed the operation required by the SNMP request 510, and returns a normal SNMP response 520 to the NMS 110. Once the SNMP response 520 is returned, Timer 1 can be reset.

FIG. 5B shows a situation where an internal timeout occurs. As shown in FIG. 5B, at the beginning, the NMS 110 sends an SNMP request 530 to the agent 130 on the managed device 120, and starts the timer Timer 2 on the NMS. In response to the receipt of the SNMP request 530, the agent 130 starts the internal timer Timer 1, and starts to perform an operation required by the SNMP request 530. In the example shown in FIG. 5B, the internal timeout period of Timer 1 is shorter than the external timeout period of Timer 2. When Timer 1 expires, the agent 130 has not completed the operation required by the SNMP request 530. Therefore, in response to the expiration of Timer 1, the agent 130 returns an internal timeout message 540 to the NMS 110 as a response to the SNMP request 530. Moreover, the agent 130 may stop performing continuously the operation required by the SNMP request. Since the NMS 110 receives the response before Timer 2 expires, no external timeout will occur at the NMS 110. Moreover, after receiving an internal timeout message 540, the NMS 110 can determine that an internal timeout has occurred in the agent 130 on the managed device 120, and thus the technician can repair the managed device 120 in a timely and targeted manner.

FIG. 5C shows a situation where an external timeout occurs. As shown in FIG. 5C, at the beginning, the NMS 110 sends an SNMP request 550 to the agent 130 on the managed device 120, and starts the timer Timer 2 on the NMS. In response to the receipt of the SNMP request 550, the agent 130 starts the internal timer Timer 1, and starts to perform an operation required by the SNMP request 550. In the example shown in FIG. 5C, the internal timeout period of Timer 1 is longer than the external timeout period of Timer 2. When Timer 2 expires, the agent 130 has not yet completed the operation required by the SNMP request 550, and thus has not sent any response to the NMS. Therefore, in response to the expiration of Timer 2, the NMS 110 retransmits an SNMP request 552 with the same request ID and content to the agent 130. Although Timer 1 has not expired, upon receiving the retransmitted request 552, the agent 130 can immediately stop processing the SNMP request 550 and send an internal timeout message 560 to the NMS 110 as a response to the retransmitted SNMP request 552. After receiving the internal timeout message 560, the NMS 110 can determine that an internal timeout has occurred in the agent 130 on the managed device 120, and thus the technician can repair the managed device 120 in a timely and targeted manner.

Figure 6:
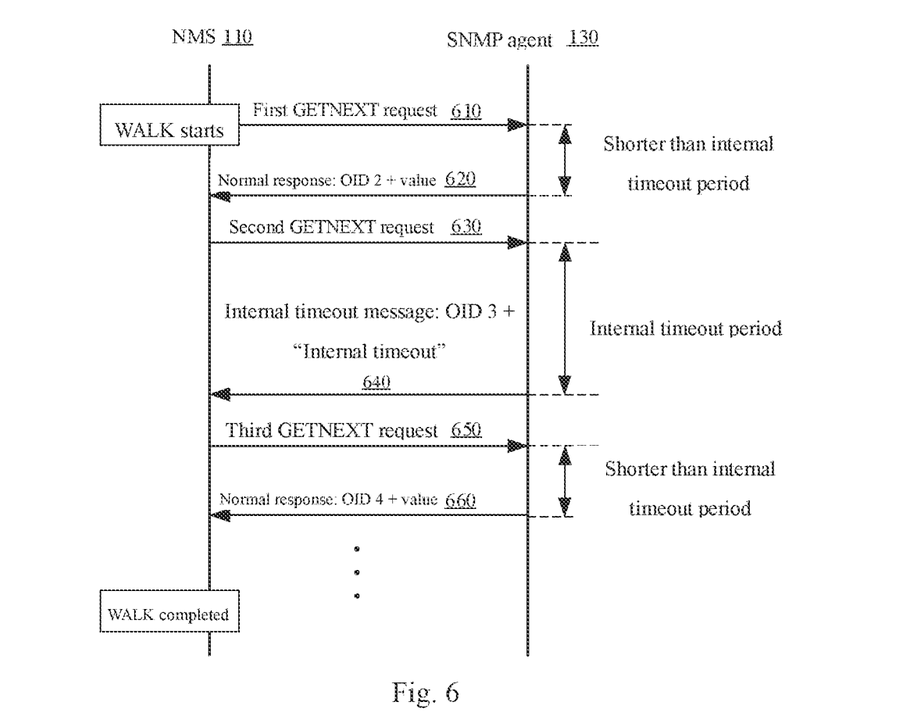
FIG. 6 shows an exemplary signaling flow for performing an SNMP WALK procedure in an SNMP managed network according to an embodiment of the present disclosure.

FIG. 6 shows an exemplary signaling flow for performing an SNMP WALK procedure in an SNMP managed network according to an embodiment of the present disclosure. In the example shown in FIG. 6, it is assumed that the internal timeout period of Timer 1 at the agent 130 is shorter than the external timeout period of Timer 2 at the NMS 110. For brevity, not all details similar to those in FIG. 5 (for example, the start of a timer) are shown in FIG. 6.

As shown in FIG. 6, at the beginning of the WALK procedure, the NMS 110 sends a first GETNEXT request 610 (the request 610 includes an OID 1) to the agent 130 on the managed device 120. Upon receiving the GETNEXT request 610, the agent 130 starts the internal timeout timer Timer 1. Before Timer 1 expires, the agent 130 acquires a subsequent object OID 2 required by the GETNEXT request 610 and the object value corresponding to the OID 2, and sends a normal response message 620 to the NMS 110. Subsequently, the NMS 110 uses the OID 2 in the response message 620 to send a second GETNEXT request 630 (the request 630 includes the OID 2). Upon receiving the GETNEXT request 630, the agent 130 restarts Timer 1. When Timer 1 expires, the agent 130 has not acquired the object value of a subsequent object OID 3 required by the GETNEXT request 630. Therefore, in response to the expiration of Timer 1, the agent 130 returns an internal timeout message 640 to the NMS 110 as a response to the GETNEXT request 630. The internal timeout message 640 includes the OID 3 and information, for example, a string of "internal timeout", indicating that a timeout has occurred at the managed device. Subsequently, the NMS 110 uses the OID 3 in the internal timeout message 640 to send a third GETNEXT request 650 (the request 650 includes the OID 3). After receiving the GETNEXT request 650, the agent 130 restarts Timer 1 and performs an operation to acquire the next object OID 4 required by the GETNEXT request 650 and the object value corresponding to the OID 4. Operations are performed similarly until all objects targeted by the WALK procedure are processed. It can be seen from FIG. 6 that although an internal timeout has occurred in processing the second GETNEXT request 630 and the NMS 110 fails to acquire the object value of the OID 3 as a result, the SNMP WALK procedure can still be successfully completed without interruption and the NMS 110 has acquired the object values of the remaining OIDs. Moreover, the NMS 110 leans that there may be a fault in the hardware or software related to the OID 3 on the managed device 120, and thus repairs can be performed correspondingly.

Those skilled in the art can understand that although some operations in the aforementioned embodiments are implemented by software, in general, the operations in the aforementioned embodiments may be implemented in various configurations and frameworks. Therefore, some or all of the operations in the aforementioned embodiments of the present disclosure may be executed by hardware, software, or both. For example, at least some operations in the communication technology can be implemented using the program instruction 322, the operating system 324 (such as a driver for the interface circuit 318), or firmware in the interface circuit 318 of the electronic device 300. Alternatively or in addition, at least some operations in the communication technology may be implemented at a physical layer, such as hardware in the interface circuit 318 of the electronic device 300.

The present disclosure can be implemented as any combination of devices, systems, integrated circuits, and computer programs on non-transitory computer-readable media. One or more processors may be implemented as an integrated circuit (IC), an application specific integrated circuit (ASIC) or a large-scale integrated circuit (LSI), a system LSI, a super LSI, or an ultra LSI component that performs part or all of the functions described in the present disclosure.

According to each step of the method of the present disclosure, it may also be executed respectively by a plurality of components included in the device. According to an embodiment, these components can be implemented as computer program modules established to realize various steps of the method, and a device including these components may realize the program module structure of the method by computer programs.

The present disclosure includes the use of software, applications, computer programs, or algorithms. Software, application programs, computer programs or algorithms can be stored on a non-transitory computer-readable medium, so that a computer with one or more processors can execute the above steps and the steps described in the drawings. For example, one or more memories save software or algorithms via executable instructions, and one or more processors may associate a set of instructions executing the software or algorithms to enhance security in any number of wireless networks according to the embodiments described in the present disclosure.

Software and computer programs (may also be referred to as programs, software applications, applications, components, or codes) include machine instructions for programmable processors, and can be realized in high-level procedural languages, object-oriented programming languages, functional programming languages, logic programming languages, or assembly languages or machine languages. The term "computer-readable medium" refers to any computer program product, device or apparatus used to provide machine instructions or data to programmable data processors, such as magnetic disks, optical disks, solid-state storage devices, memories, and programmable logic devices (PLDs), including computer-readable media that receive machine instructions as computer-readable signals.

For example, the computer-readable medium may include dynamic random access memory (DRAM), random access memory (RAM), read-only memory (ROM), electrically erasable read-only memory (EEPROM), compact disk read-only memory (CD-ROM) or other optical disk storage devices, magnetic disk storage devices or other magnetic storage devices, or any other medium that can be used to carry or store a required computer-readable program code in the form of an instruction or a data structure and that can be accessed by a general-purpose or special-purpose computer or a general-purpose or special-purpose processor. As used herein, magnetic disks or disks include compact discs (CDs), laser disks, optical disks, digital versatile disks (DVDs), floppy disks, and Blu-ray disks, where magnetic disks usually copy data magnetically, and disks use laser to optically copy data. Combinations of the above also fall into the scope of computer-readable media.

In one or more embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the above-mentioned features, other features or modifications can be expected. It is expected that any newly emerging technology that may replace any of the above-mentioned implementation technologies can be used to complete the implementation of the components and functions of the present disclosure.

In addition, the above description provides examples without limiting the scope, applicability, or configuration set forth in the claims. Without departing from the spirit and scope of the present disclosure, changes may be made to the function and arrangement of the discussed elements. Various processes or components may be omitted, substituted, or added in the embodiments as appropriate. For example, features described with respect to some embodiments may be combined in other embodiments.

Similarly, although operations are depicted in a specific order in the drawings, this should not be understood as requiring such operations to be performed in the specific order shown or in a sequential order, or requiring the performance of all illustrated operations to achieve the desired result. In some cases, multi-tasking and parallel processing can be advantageous.

The invention claimed is:

1. An electronic device, including:
a memory, on which instructions are stored; and
a processor, configured to execute the instructions stored on the memory to cause the electronic device to execute the following operations:
receiving a Simple Network Management Protocol (SNMP) request from a network management station;
in response to the receipt of the SNMP request, starting a timer at the electronic device, a timeout period of the timer being set to a first predetermined time period;
in response to a case where the electronic device has not completed an operation required by the SNMP request when the timer expires, sending a timeout message to the network management station as a response to the SNMP request; and
in response to the receipt of a retransmitted SNMP request with the same request ID as the SNMP request from the network management station before the timer expires, stopping processing the SNMP request, and sending the timeout message to the network management station as a response to the retransmitted SNMP request.

2. The electronic device according to claim 1, wherein the timeout message includes: an object identifier, i.e., OID, of an object to be operated according to the SNMP request, and information indicating that a timeout has occurred at the electronic device.

3. The electronic device according to claim 2, wherein the electronic device includes a plurality of subsystems, and the timeout message further includes information indicating a subsystem that has not completed the SNMP request when the timeout occurs.

4. The electronic device according to claim 2, wherein the SNMP request is a GETNEXT request or a GETBULK request included in an SNMP WALK procedure, and the OID included in the timeout message is used to continue the SNMP WALK procedure.

5. The electronic device according to claim 1, wherein the first predetermined time period is shorter than a second predetermined time period set by the network management station for monitoring the timeout of the SNMP request.

6. The electronic device according to claim 1, wherein an SNMP agent is running on the electronic device, and wherein the SNMP agent and the network management station communicate through a user datagram protocol.

7. The electronic device according to claim 1, wherein the timeout message conforms to a format of an SNMP response corresponding to the SNMP request.

8. A method executed by an electronic device, including:
receiving a Simple Network Management Protocol (SNMP) request from a network management station;
in response to the receipt of the SNMP request, starting a timer at the electronic device, a timeout period of the timer being set to a first predetermined time period;
in response to a case where the electronic device has not completed an operation required by the SNMP request when the timer expires, sending a timeout message to the network management station as a response to the SNMP request; and
in response to the receipt of a retransmitted SNMP request with the same request ID as the SNMP request from the network management station before the timer expires, stopping processing the SNMP request, and sending the timeout message to the network management station as a response to the retransmitted SNMP request.

9. The method according to claim 8, wherein the timeout message includes: an object identifier, i.e., an OID, of an object to be operated according to the SNMP request, and information indicating that a timeout has occurred at the electronic device.

10. The method according to claim 9, wherein the electronic device includes a plurality of subsystems, and the timeout message further includes information indicating a subsystem that has not completed the SNMP request when the timeout occurs.

11. The method according to claim 9, wherein the SNMP request is a GETNEXT request or a GETBULK request included in an SNMP WALK procedure, and the OID included in the timeout message is used to continue the SNMP WALK procedure.

12. The method according to claim 8, wherein the first predetermined time period is shorter than a second predetermined time period set by the network management station for monitoring the timeout of the SNMP request.

13. The method according to claim 8, wherein an SNMP agent is running on the electronic device, and wherein the SNMP agent and the network management station communicate through a user datagram protocol.

14. A non-transitory computer-readable storage medium having instructions stored thereon, when executed by a processor of an electronic device, the instruction causing the electronic device to execute the following operations:

receiving a Simple Network Management Protocol (SNMP) request from a network management station;

in response to the receipt of the SNMP request, starting a timer at the electronic device, a timeout period of the timer being set to a first predetermined time period;

in response to a case where the electronic device has not completed an operation required by the SNMP request when the timer expires, sending a timeout message to the network management station as a response to the SNMP request; and in response to the receipt of a retransmitted SNMP request with the same request ID as the SNMP request from the network management station before the timer expires, stopping processing the SNMP request, and sending the timeout message to the network management station as a response to the retransmitted SNMP request.

15. The non-transitory computer-readable medium according to claim 14, wherein the timeout message includes: an object identifier, i.e., OID, of an object to be operated according to the SNMP request, and information indicating that a timeout has occurred at the electronic device.

16. The non-transitory computer-readable medium according to claim 15, wherein the electronic device includes a plurality of subsystems, and the timeout message further includes information indicating a subsystem that has not completed the SNMP request when the timeout occurs.

17. The non-transitory computer-readable medium according to claim 15, wherein the SNMP request is a GETNEXT request or a GETBULK request included in an SNMP WALK procedure, and the OID included in the timeout message is used to continue the SNMP WALK procedure.

18. The non-transitory computer-readable medium according to claim 14, wherein the first predetermined time period is shorter than a second predetermined time period set by the network management station for monitoring the timeout of the SNMP request.

19. The non-transitory computer-readable medium according to claim 14, wherein an SNMP agent is running on the electronic device, and wherein the SNMP agent and the network management station communicate through a user datagram protocol.

\* \* \* \* \*